(12) United States Patent
Valluru et al.

(10) Patent No.: US 7,499,977 B1
(45) Date of Patent: Mar. 3, 2009

(54) METHOD AND SYSTEM FOR FAULT MANAGEMENT IN A DISTRIBUTED NETWORK MANAGEMENT STATION

(75) Inventors: Sudhakar Valluru, San Jose, CA (US); Srikumar Chari, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 643 days.

(21) Appl. No.: 10/047,211

(22) Filed: Jan. 14, 2002

(51) Int. Cl.
*G06F 15/16* (2006.01)
*H04Q 11/00* (2006.01)
*H04Q 7/20* (2006.01)
*H04H 20/28* (2008.01)
*H04B 7/14* (2006.01)
*H04B 7/00* (2006.01)

(52) U.S. Cl. ............... 709/208; 370/386; 370/487; 455/39; 455/41.2; 455/507

(58) Field of Classification Search ........... 709/223, 709/227, 208, 222, 221, 209, 210, 211; 700/3; 710/104, 105, 110, 113; 712/20; 370/386, 370/487; 455/39, 41.2, 507
See application file for complete search history.

(56) References Cited

U.S. PATENT DOCUMENTS

| | | | |
|---|---|---|---|
| 5,202,822 A * | 4/1993 | McLaughlin et al. | 700/82 |
| 6,199,133 B1 * | 3/2001 | Schnell | 710/110 |
| 6,304,576 B1 * | 10/2001 | Corley et al. | 370/408 |
| 6,343,320 B1 * | 1/2002 | Fairchild et al. | 709/224 |
| 2001/0002912 A1 * | 6/2001 | Tony et al. | 370/487 |
| 2001/0029166 A1 * | 10/2001 | Rune et al. | 455/41 |
| 2002/0044549 A1 * | 4/2002 | Johansson et al. | 370/386 |
| 2002/0168943 A1 * | 11/2002 | Callaway et al. | 455/67.1 |
| 2003/0005100 A1 * | 1/2003 | Barnard et al. | 709/223 |
| 2003/0012168 A1 * | 1/2003 | Elson et al. | 370/338 |

* cited by examiner

*Primary Examiner*—Joseph E Avellino
*Assistant Examiner*—Guang Li
(74) *Attorney, Agent, or Firm*—Stolowitz Ford Cowger LLP

(57) ABSTRACT

A method and system for fault management in a distributed network management station is disclosed. In one method embodiment, the present invention initiates a first device coupled to a network. Next, the present invention broadcasts an information packet to a plurality of devices coupled to the network. The first device then resolves the status of the plurality of devices coupled to the network. In so doing, the resolved network results in a distributed network management station having a defined master device.

44 Claims, 7 Drawing Sheets

METHOD AND SYSTEM FOR FAULT MANAGEMENT IN A DISTRIBUTED NETWORK MANAGEMENT STATION

FIELD OF THE INVENTION

The present claimed invention relates to the field of computer networking. Specifically, the present claimed invention relates to a method and system for fault management in a distributed network management station.

BACKGROUND ART

A network is a system that transmits any combination of voice, video, and data between users. A network includes the operating system (OS), the cables coupling them, and all supporting hardware such as bridges, routers, and switches. In today's market, there are many types of networks. For example, there are communications networks and there are telephone switching system networks. In general, a network is made up of at least one server, a workstation, a network operating system, and a communications link.

Communications networks are normally broken down into categories based on their geographical coverage. For example, there is a local area network (LAN) which is normally contained within a building or complex, a metropolitan area network (MAN) which normally covers a city, and a wide area network (WAN) which may cover an entire country. The controlling software on a communications network is normally a network operating system (such as NetWare, UNIX, Windows NT, etc.) which resides on the server. Further, a piece of the controlling software resides on each local workstation and allows the workstation to read and write data from the server.

A block diagram of an exemplary network computing system is illustrated in FIG. 1. Generally speaking, the exemplary network includes personal computing system (PC) 104, and switch 102. Although a specific number of PC 104s are shown, the exemplary network may maintain any number of PC 104s. Moreover, PC 104 may be a desktop computing system, or a blade type of computing system designed to comply specifically with a compact PCI chassis. In addition, switch 102 may be a LAN, WAN, or PBX switch 102. Switch 102 is a mechanical or electronic device which directs the flow of electrical or optical signals from one side to the other.

A second block diagram of an exemplary networked computing system with the addition of router 210 and ethernet 220 is illustrated in FIG. 2. In FIG. 2, router 210 is utilized as a forwarding device. For example, router 210 is used to move data packets from one LAN, WAN or PBX to another. As a result, router 210 can segment LANs, WANs or PBXs in order to balance traffic within workgroups and to filter traffic overall. In the exemplary network illustrated in FIG. 2, switch 102 is connected to an ethernet connection 220. Ethernet 220 is the most widely used LAN access method, defined by the IEEE as the 802.3 standard.

On such an exemplary network as shown in FIGS. 1 and 2, message transfer is managed by a transport protocol such as transmission control protocol/internet protocol (TCP/IP). The physical transmission of data is performed by the access method (ethernet, token ring, etc.) which is implemented in the network adapters, while the actual communication takes place over the interconnecting network cable.

Presently, networks such as these can be found in almost all aspects of modern life. They are used both at home, and in the workplace. Networks are responsible for great expansions in the area of technological access. For example, a company may use a network to link many cheaper, less powerful computers to a few expensive, very powerful computers. In so doing, the less powerful computers are able to do a greater variety of work. Additionally, the less powerful computers are able to utilize many different programs which would not fit on their own hard drives. Neither of these advantages would be possible without the network. Therefore, this ability to utilize a network type system, maintaining many cheap computers that have access to the few expensive ones, saves a company large amounts of money.

Due to the many benefits of a network environment, many companies rely heavily on them. With such a reliance upon networks and networking capabilities, a need to maintain a quality network with high reliability factors is paramount in any workplace or industry. In fact, most companies are dependent on a solidly structured network system. Due to this requirement, a network management station is important to ensure the proper upkeep of the network.

A network management station is used to monitor an active communications network in order to diagnose problems and gather statistics for administration and fine-tuning. Because of the importance of a solid network management station, there are many types of network management station possibilities in the computer networking industry. Each station maintains aspects of diagnosis, statistical data, or fine tuning capabilities which appeal to a specific industry network. In some instances, the appeal of the network management station is simply due to the type of operating system run by the network.

One disadvantage of a network in general and a network management station in particular, is the possible inability to resolve internal network issues resulting from conflicting devices. Specifically, as a particular device is added to or removed from a network, the rest of the network may experience difficulties arising from the change. For example, if another main (NM) device is removed from the network either accidentally or on purpose, the entire network may become sluggish and possibly inoperative due to the loss of the provisioning and monitoring functionality provided by the NM device. Further, if a new device is added to the network and it is a master device, a conflict between the two master devices may result in network confusion and a possible network crash. Similar conflicts may result from the addition of one network to another. Specifically, another network may be combined with the original network in order to keep up with the demands of a growing or expanding company. Upon combination of the two networks, a second master device may accidentally be introduced. The introduction of a second master will result in the same problems as described above.

Another problem arises with the resolution techniques based on the previously mentioned problems. Specifically, if a network crashes due to either the loss of a master device or the addition of a second master device, the network management station must then apply time and personnel on the resolution of the problem. For example, a situation resulting in two competing master devices may take a network technician quite a while to troubleshoot. In order to resolve the issue, the technician must debug the network and demote one of the master devices to a secondary device. The other problem, e.g. no master device, would require a technician to again debug the network and promote one of the secondary devices to a master device. This type of network debugging takes time to resolve, thus costing the network users and owners a large amount of money in lost productivity alone.

Thus, a need exists for a method and system for fault management in distributed network management stations. A further need exists for a method and system for fault management in a distributed network management station which is scalable. Another need exists for a method and system for fault management in a distributed network management station which automatically learns about the presence of other participating devices. Yet another need exists for a method and system for fault management in a distributed network management station which is self-healing.

SUMMARY OF INVENTION

The present invention provides, in various embodiments, a method and system for fault management in a distributed network management station. The present invention initiates a first device coupled to a network. Next, the present invention broadcasts an information packet to a plurality of devices coupled to the network. The first device then resolves the status of the plurality of devices coupled to the network. In so doing, the resolved network results in a distributed network management station having a defined master device.

The distributed network management station further initiates a fail-over process. In the present invention, the fail-over process results in a secondary devices re-evaluation of the master device. Specifically, the re-evaluation is due to the loss of communication with the master device. Thus, the loss of communication results in the secondary devices questioning the state or status of the master device to ensure the network re-establishes a master device.

BRIEF DESCRIPTION OF THE DRAWINGS

The accompanying drawings, which are incorporated in and form a part of this specification, illustrate embodiments of the invention and, together with the description, serve to explain the principles of the invention.

PRIOR ART

PRIOR ART

Figure 1:
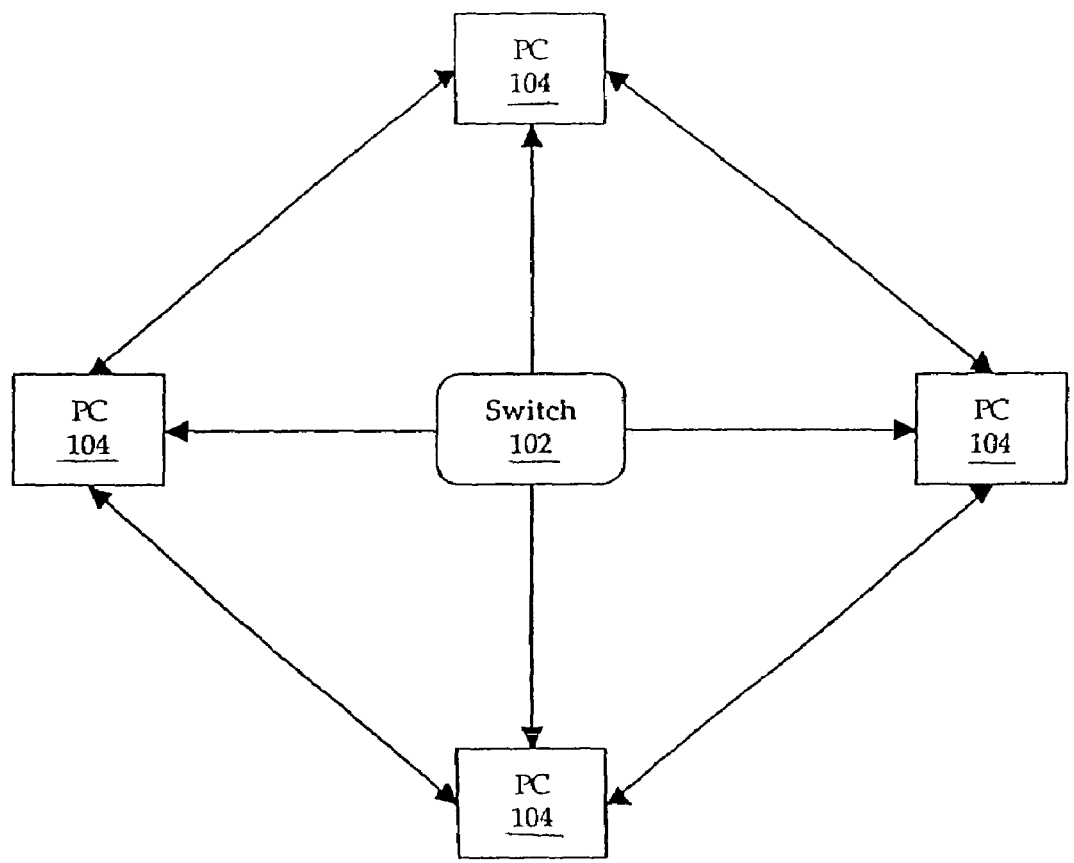
FIG. 1 is a block diagram of an exemplary networked computing system in accordance with one embodiment of the present invention.
Figure 2:
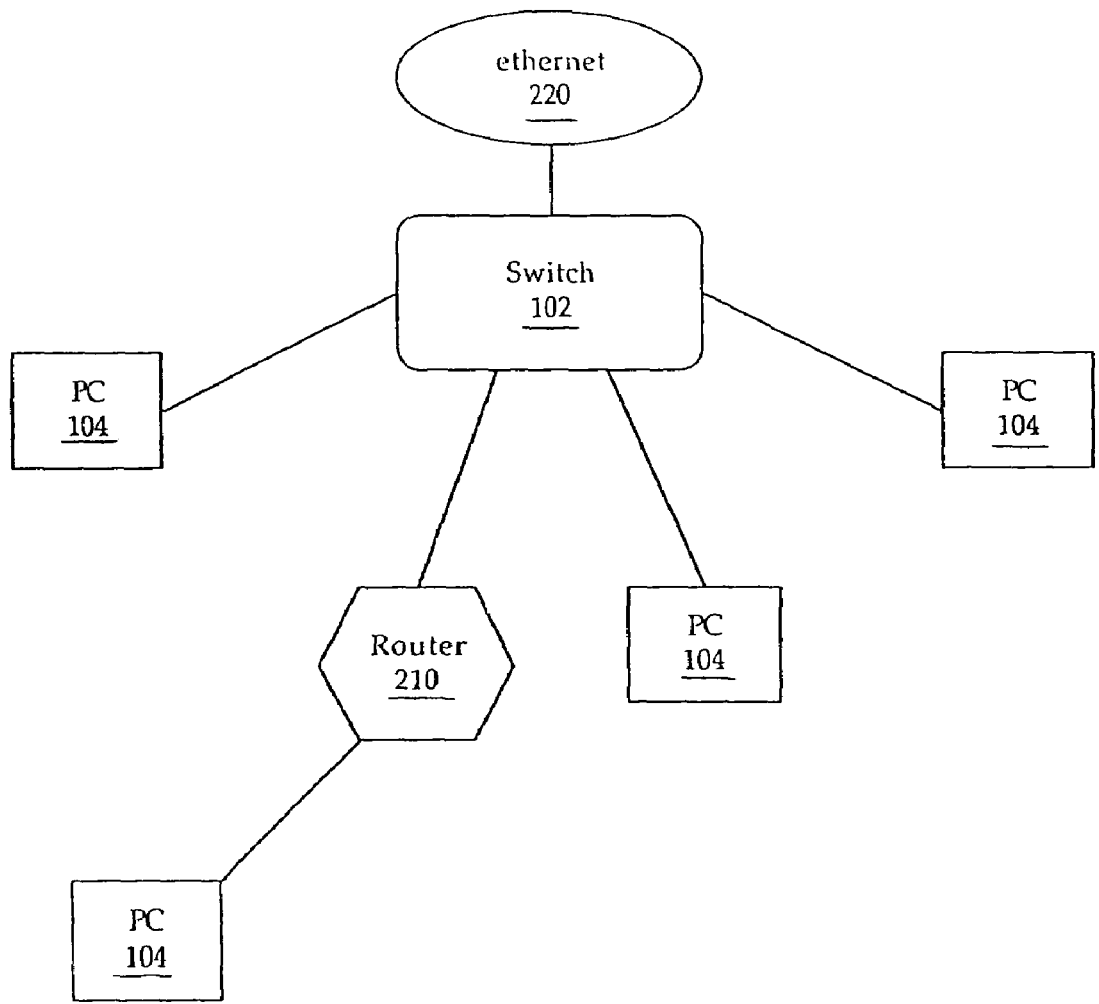
FIG. 2 is a block diagram of an exemplary networked computing system in accordance with another embodiment of the present invention.

The drawings referred to in this description should be understood as not being drawn to scale except if specifically noted.

DESCRIPTION OF THE PREFERRED EMBODIMENTS

In the following detailed description of the present invention, a method and system for fault management in a distributed network management station, specific details are set forth in order to provide a thorough understanding of the present invention. However, it will be recognized by one skilled in the art that the present invention may be practiced without these specific details or with equivalents thereof. In other instances, well-known methods, procedures, components, and circuits have not been described in detail as not to unnecessarily obscure aspects of the present invention.

Notation and Nomenclature

Some portions of the detailed descriptions that follow are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those that require physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "initiating", "broadcasting", "resolving", "processing" or the like, refer to the action and processes of a computer system (e.g., FIGS. 4 through 7), or similar electronic computing device, that manipulates and transforms data represented as physical (electronic) quantities within the computer system's registers and memories into other data similarly represented as physical quantities within the computer system memories or registers or other such information storage, transmission or display devices.

Aspects of the present invention, described below, are discussed in terms of steps executed on a computer system. These steps (e.g., processes 600 and 700) are implemented as program code stored in computer readable memory units of computer systems and are executed by the processor of the computer system. Although a variety of different computer systems can be used with the present invention, an exemplary wireless computer system is shown in FIG. 3.

Figure 3:
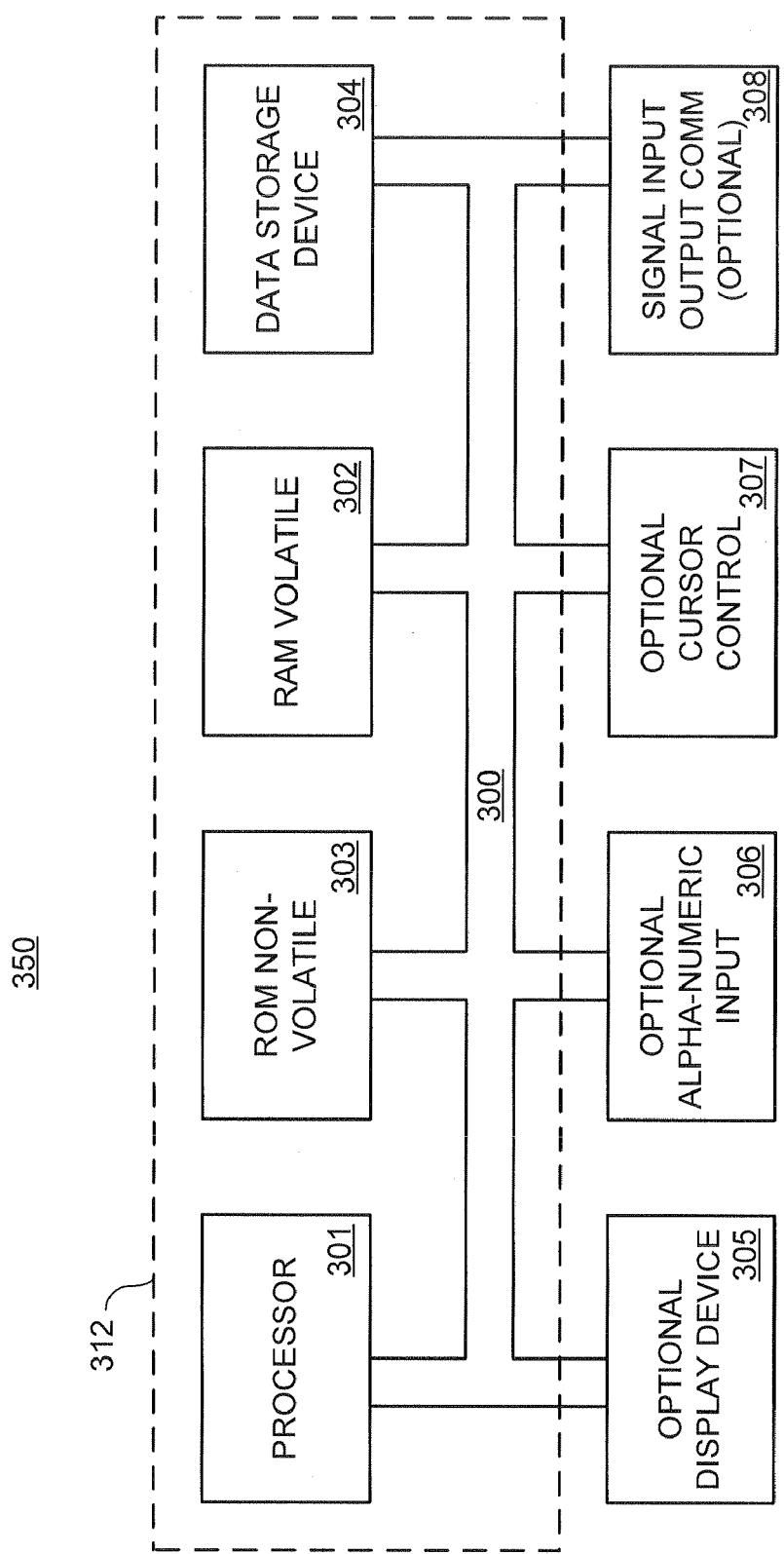
FIG. 3 is a block diagram of the exemplary circuitry of a computing system in accordance with one embodiment of the present invention.

With reference now to FIG. 3, portions of the present fault management method and system are comprised of computer-readable and computer-executable instructions which reside, for example, in computer-usable media of a computer system. FIG. 3 illustrates an exemplary computer system 312 used in accordance with one embodiment of the present network management station invention. It is appreciated that system 312 of FIG. 3 is exemplary only and that the present invention can operate on or within a number of different computer systems including general purpose networked computer systems, embedded computer systems, routers, switches, server devices, client devices, various intermediate devices/nodes, stand alone computer systems, and the like. Additionally, computer system 312 of FIG. 3 is well adapted having computer readable media such as, for example, a floppy disk, a compact disc, and the like coupled thereto. Such computer readable media is not shown coupled to computer system 312 in FIG. 3 for purposes of clarity.

System 312 of FIG. 3 includes an address/data bus 300 for communicating information, and a central processor unit 301 coupled to bus 300 for processing information and instructions. Central processor unit 301 may be an 80x86-family microprocessor. System 312 also includes data storage features such as a computer usable volatile memory 302, e.g. random access memory (RAM), coupled to bus 300 for storing information and instructions for central processor unit 301, computer usable non-volatile memory 303, e.g. read only memory (ROM), coupled to bus 300 for storing static information and instructions for the central processor unit 301, and a data storage unit 304 (e.g., a magnetic or optical disk and disk drive) coupled to bus 300 for storing information and instructions. System 312 of the present invention also includes an optional alphanumeric input device 306 including alphanumeric and function keys coupled to bus 300 for communicating information and command selections to central processor unit 301. System 312 also optionally includes an optional cursor control device 307 coupled to bus 300 for communicating user input information and command selections to central processor unit 301. System 312 of the present embodiment also includes an optional display device 305 coupled to bus 300 for displaying information.

Figure 4:
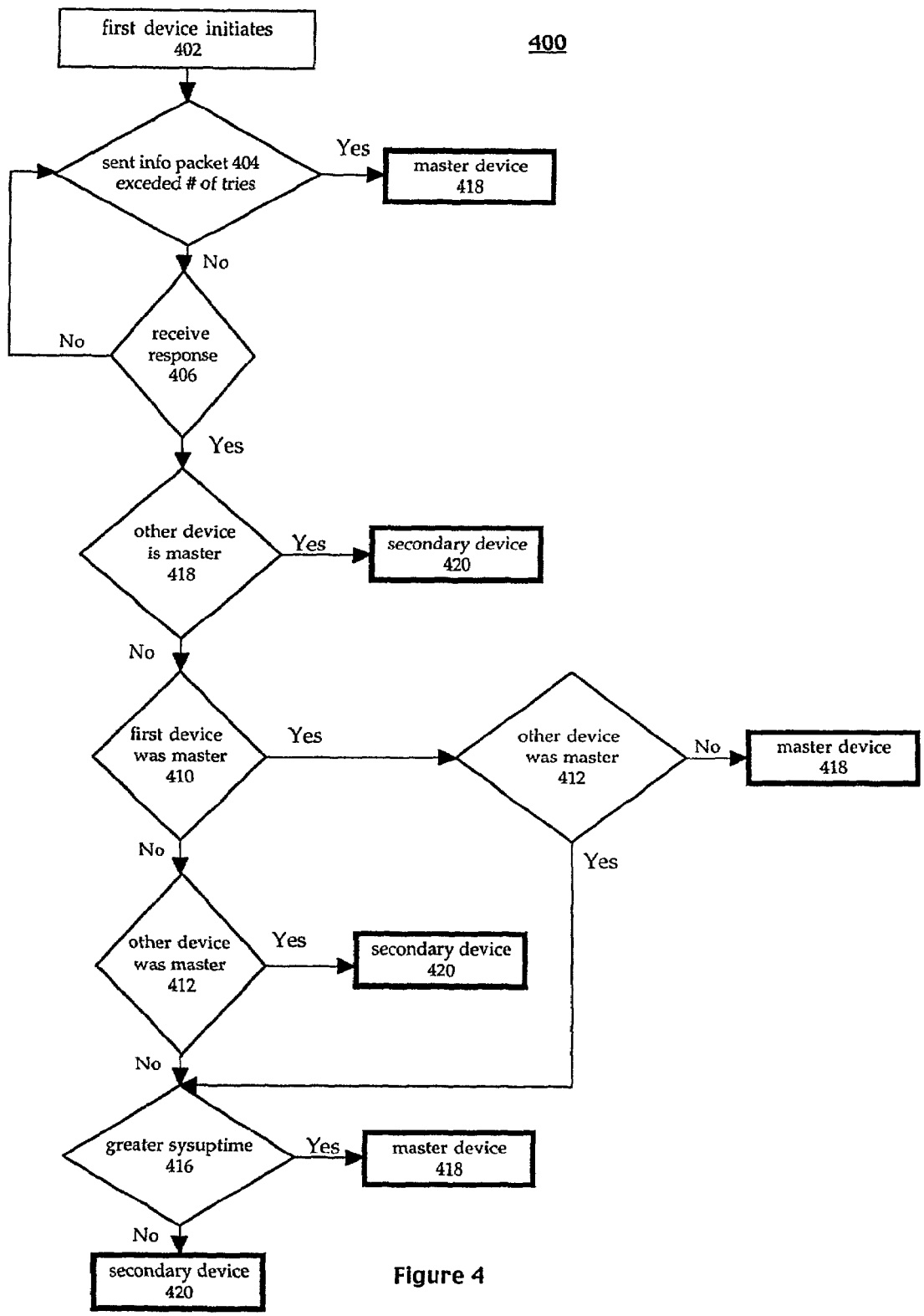
FIG. 4 is a block diagram of the steps in an exemplary process for a first device being coupled to a network in accordance with one embodiment of the present invention.
Figure 5:
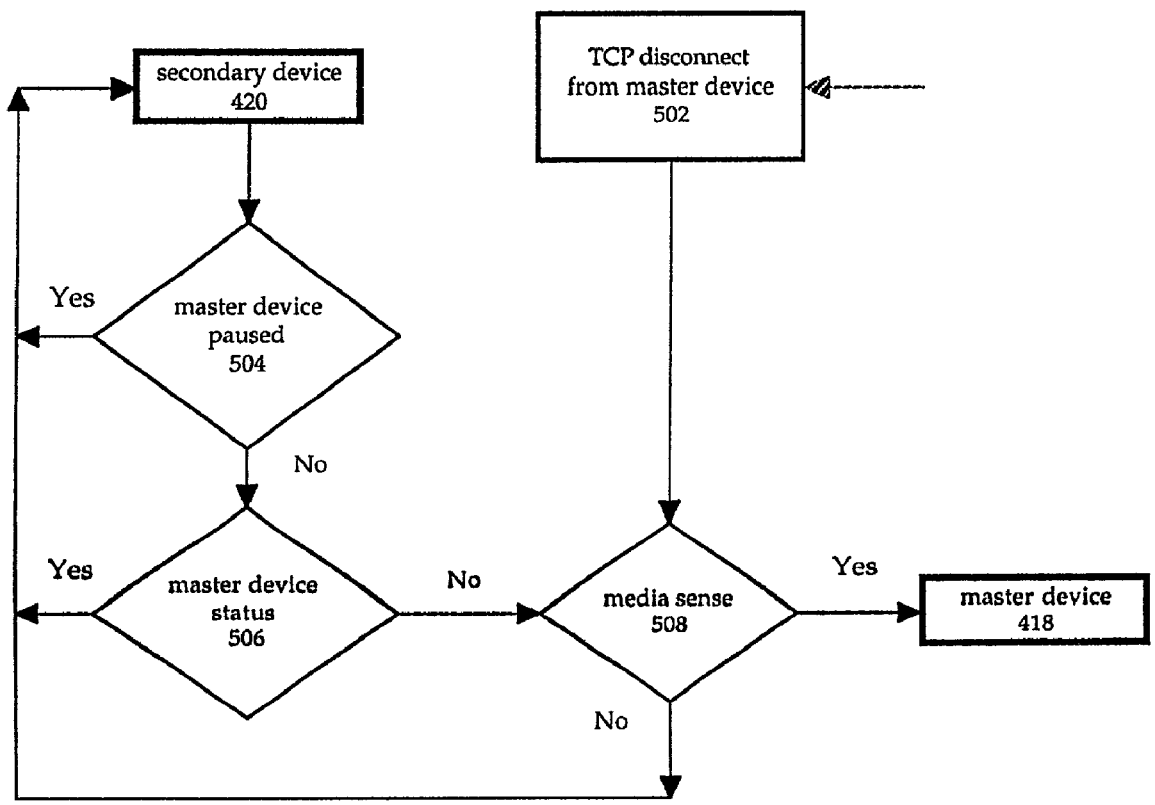
FIG. 5 is a block diagram of the steps in an exemplary process for master device failure management in accordance with one embodiment of the present invention.

With reference next to FIGS. 4 through 7, flow charts 600 and 700 are illustrations of the exemplary steps used by an embodiment of the present invention. FIGS. 4 and 5 include processes 400 and 500 of the present invention which, in one embodiment, are carried out by a processor under the control of computer-readable and computer-executable instructions. The computer-readable and computer-executable instructions reside, for example, in data storage features such as computer usable volatile memory 302, computer usable non-volatile memory 303, and/or data storage device 304 of FIG. 3. The computer-readable and computer-executable instructions are used to control or operate in conjunction with, for example, central processing unit 301 of FIG. 3.

Figure 6:
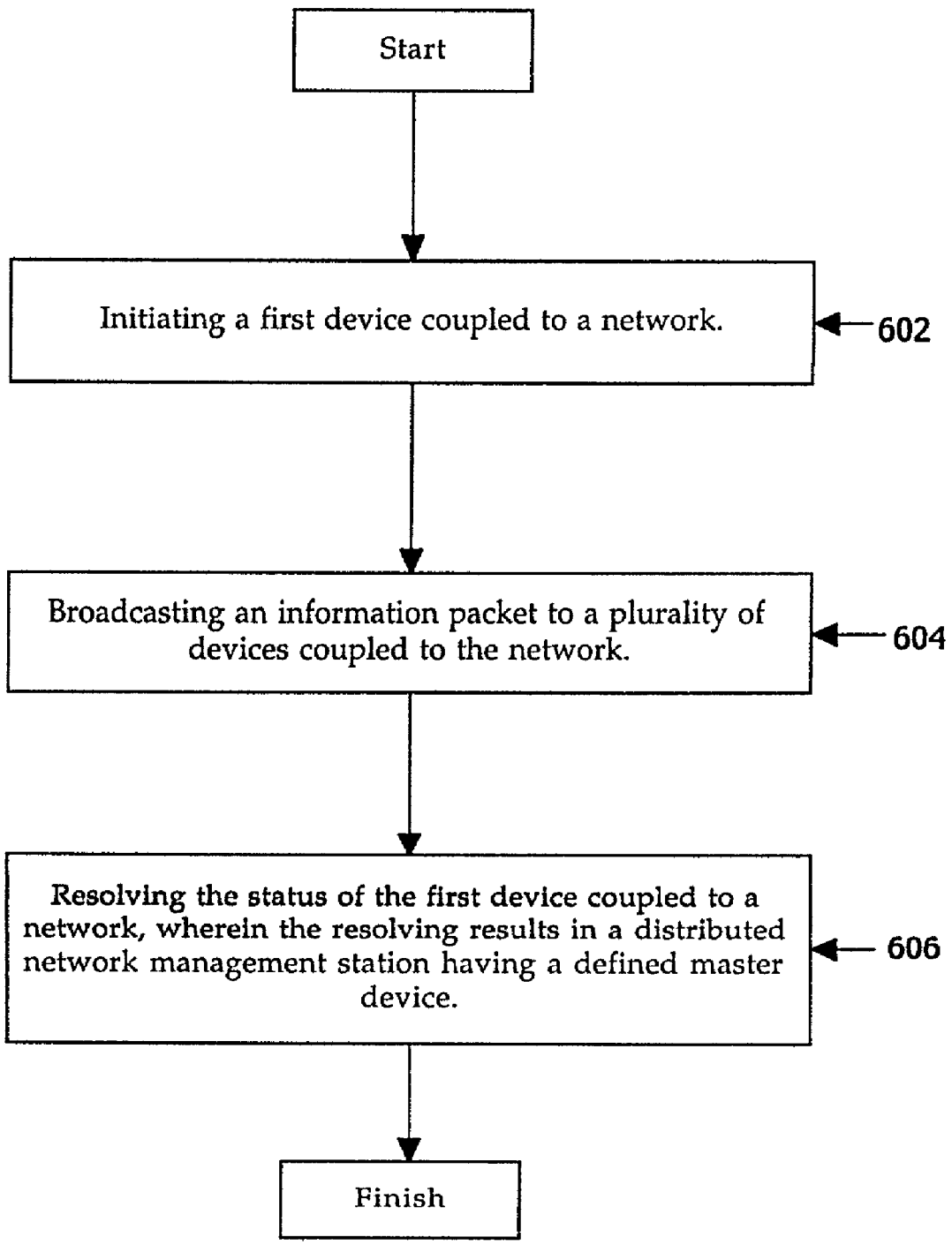
FIG. 6 is a flow chart of steps in an exemplary method for fault management in a distributed network management station, in accordance with one embodiment of the present invention.

With reference now to step 602 of FIG. 6 and FIG. 4, the present invention initiates a first device coupled to a network. In one embodiment, the first device may be a single processing element (SPE) device. Further, the first device is computing system 312. Moreover, in one embodiment, computing system 312 is a desktop computing system connected to a network. In yet another embodiment, computing system 312 is a blade type of computing system designed to comply specifically with a compact PCI chassis. Although only one specific device 312 is being initiated in the present embodiment, the exemplary process as illustrated in FIG. 4 may maintain any number of devices 312 initiating at the same time. The reason for showing only one initiating first device 312 is merely for purposes of clarity and brevity.

In accordance with the initiation of a first device 312 coupled to a network as illustrated in process 400, first device 312 initiates 402 as a secondary device 420. That is, upon coupling to the network, first device 312 will enter as a secondary device 420. In general, initiating 402 as a secondary device 420 will occur independent of how first device 312 was coupled to the network. Specifically, first device 312 will initiate 402 as a secondary device 420 regardless of whether it was introduced at the start-up of the network, or as a plug-and-play device introduced into a fully functional network. The purpose of first device 312 initiating 402 as a secondary device 420 is to refrain from an initial conflict of interest between a plurality of devices trying to function as master device 418.

As an example, during the initial start-up of a network, if each device 312 initiates 402 as a secondary device 420, the conventional method of a voting process to decide the master device 418 can be avoided. In its place, process 400 illustrated in FIG. 4 can be used to accomplish the same goal. Process 400 increases network proficiency by streamlining both startup time and conflict resolution. A further benefit to the network is obvious in any plug-and-play type introduction of a first device 312. Since first device 312 initiates 402 as a secondary device 420, there is no need to worry about introducing a conflicting master device 418 into a well running network. Therefore, any conflict which may have arisen by a newly introduced first device 312 trying to dominate a pre-existing network is resolved using process 400 of FIG. 4.

With reference now to step 604 of FIG. 6 and to process 400 of FIG. 4, first device 312 broadcasts an information packet 404 to a plurality of devices 312 coupled to the network. In so doing, first device 312 introduces itself to the network. In one embodiment, information packet 404 is a multicast packet. Information packet 404 includes a participating-device internet protocol (IP) and a participating-device message authentication code (MAC) specific to first device 312. In general, the IP and MAC of first device 312 are addresses which identify the source of information packet 404. For example, the IP and MAC may include a chassis identification and slot number of first device 312 if it is located on a PCI chassis.

Information packet 404 further includes information regarding the previous state of first device 312. Specifically, the previous state refers to the position of first device 312 during its last operational period. That is, what job first device 312 had during its previous use. For example, whether first device 312 was a master device 418 during its previous operational period or if it was a secondary device 420. It may even be possible that first device 312 had never been previously activated. In such a case, the previous state of first device 312 would be non-existent.

Further the broadcast of information packet 404, includes information regarding the current state of first device 312. Specifically, the assumed state of first device 312 after the startup logic. In general, the current state would be as a secondary device 420 unless a startup logic had designated first device 312 to be a master device 418 upon startup. A reason for a master device 418 designation could be to further increase the startup time of the network. Therefore, it is appreciated that, if all other devices 312 default as secondary devices 420, there would be absolutely zero conflict for master device 418.

The last piece of information broadcast, in this embodiment of information packet 404, regards the total system-up-time (sysuptime) 416 of first device 312. Sysuptime 416 is the total time that first device 312 has in an operational mode. This type of information is provided in information packet 404 as a final way to resolve any dispute with regard to which device 312 should become master device 418 of the network. In addition, the present invention is well suited to the addition or subtraction of any portions of information packet 404. However, in this embodiment, the intricacies of the resolution technique established by the present invention in process 400 are outlined below.

With reference now to step 606 of FIG. 600 and to FIG. 4, the status of first device 312 coupled to a network is resolved. The result is a distributed network management station having a defined master device 418. In general, the status between first device 312 and the plurality of devices 312 is resolved by an evaluation of each information packet 404 from first device 312 and the plurality of devices 312. Specifically, the resolution is possible due to the implementation of process 400 of FIG. 4.

With reference still to step 606 of FIG. 600 and to FIG. 4, information packet 404 is broadcast to the network a specified number of times. In one embodiment, information packet 404 is broadcast three times. Between each broadcast of information packet 404 first device 312 will listen for a specified amount of time in order to receive a response 406. After each broadcast of information packet 404, there is a decision made by the logic. If there is no response to any of the broadcasts, then after the specified number of broadcasts is reached, first device 312 will assume the role of master device 418. In that assumption, all rights and responsibilities of a network master device 418 will be assumed by first device 312. However, if a response 406 is received, then an evaluation of the plurality of devices 312 and their information packets 404 will be made.

With further reference to step 606 of FIG. 600 and to FIG. 4, the initial evaluation of the response 406 will be a check to see if any of the plurality of devices 312 are designated as master device 418. If any of the plurality of devices 312 is designated master device 418, then all other devices 312 including first device 312 will remain as secondary devices 420. In such an example, the resolution of master device 418 is complete and a quick network integration is accomplished.

With reference still to step 606 of FIG. 600 and to FIG. 4, if none of the plurality of devices 312 are designated as master device 418, then a further comparison of information packet 404 must take place. The next criterion is the previous state of first device 312. Specifically, whether or not any previous state of first device 312 was as a master device 418. The same evaluation is then used on each responding device 312. If first device 312 was a master and no other responding devices 312 ever was a master device 418, then first device 312 becomes master device 418. However, if any other of the plurality of devices 312 were also a master device 418 during a previous state, then an even deeper evaluation needs to take place. The deeper evaluation is a comparison of sysuptime 416 to evaluate which device 312 has priority. In such a comparison, whichever device 312 has the most sysuptime 416 will become master device 418 while all other devices 312 will remain as secondary devices 420.

However, if first device 312 was never a master device 418, first device 312 will still evaluate each responding device 312 for prior master device 418 status. If any responding device 312 was a master device 418 during a previous state, then no further evaluation need take place. The responding device 312 which was a previous master device 418 will again become master device 418 while all other devices 312 will remain as secondary devices 420. However, if no responding device 312 was ever a master device 312, then a further evaluation of sysuptime 416 is required to evaluate which of the responding devices 312 has priority. In such a comparison, the responding device 312 with the most sysuptime 416 will become master device 418 while all other responding devices 312 will remain as secondary devices 420.

By utilizing process 400, an established distributed network management station is formed. There are many important aspects of the distributed network management station. One aspect is the integration of plug-and-play capability of each of the plurality of devices 312 into the network. Specifically, a device 312 can be introduced into the running network with minimal provisioning. In general, as a new component is added it is simply fluxed into the network. That is, due to the device 312 initiating 402 as a secondary device 420 and the ability of any device 312 within the network to demote itself, seamless integration into a network operating in a stable state can take place. In addition, the above mentioned benefits of the present invention are also benefits which are realized in the scalability of the network. As a result, the plurality of devices 312 utilized by the network may be expanded without worry of multiple master devices 418 causing a conflict or slowing the convergence of the network.

Figure 7:
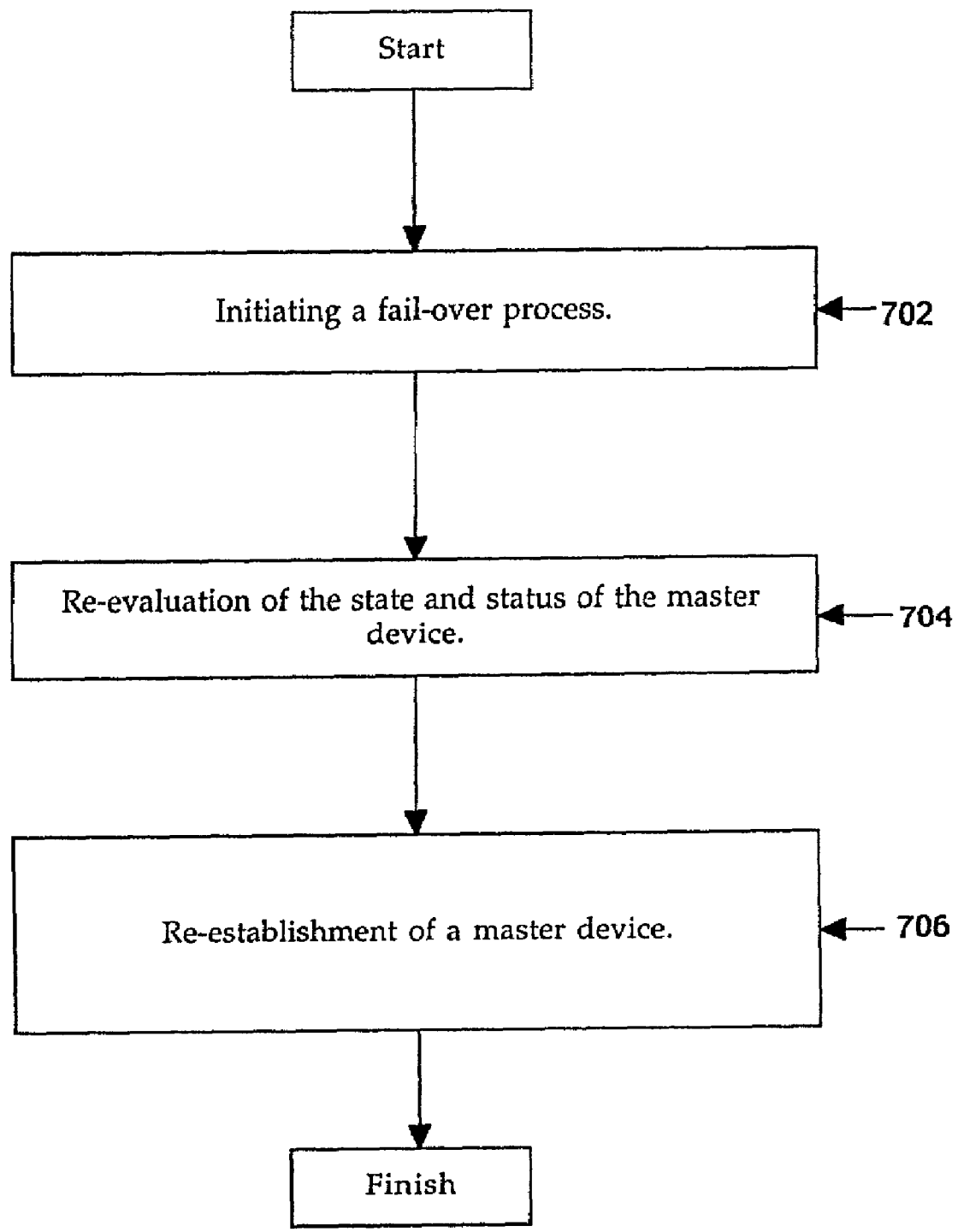
FIG. 7 is a flow chart of steps in another exemplary method for fault management in a distributed network management station, in accordance with one embodiment of the present invention.

With reference now to step 702 of FIG. 7 and to FIG. 5, the present invention initiates a fail-over process. Specifically, the distributed network management station integrates the self-healing capabilities of each of the plurality of devices 312 into the network. That is, if the network fails to hear from the designated master device 418, process 500 is applied to resolve the issue. As a result, the loss of master device 418 in the present invention, is not a network-crashing event. In fact, with the utilization of process 500, the loss of master device 418 results in a quick replacement of master device 418 by the next most-senior secondary device 420.

With reference now to step 704 of FIG. 7 and to FIG. 5, the present invention reevaluates the status of master device 418. In general, upon loss of contact with master device 418, the next most senior secondary device 420 begins process 500 in order to establish the state and status of master device 418. Initially, secondary device 420 checks to see if master device 418 is in a paused 504 state. If master 418 is paused 504, then secondary SPE 420 will remain in its secondary state. There are many reasons for a master SPE 418 to enter a paused state. One of the major reasons for a paused state is a network configuration. Normally, during a pause 504 due to a network configuration, master device 418 will issue a statement telling the plurality of devices 312 in the network not to transition. This command will remain in effect for a given time period. However, once the given time period is surpassed the need for a status re-evaluation of master device 418 becomes necessary. There are many additional reasons for a master device 418 to enter a paused state that are familiar to one skilled in the art. However, they are not expressed herein for purposes of brevity.

With reference still to step 704 of FIG. 7 and to FIG. 5, if the master device 418 is being re-evaluated and it is not in a paused 504 state, then status 506 of master device 418 must be further questioned. If no response is received from master 15, device 418, it is obvious that master device 418 has lost its media sense 508. For example, the loss of media sense 508 may result from a crash within master device 418, or from a TCP disconnect 502 from master device 418. If master device 418 returns no status, then secondary device 420 moves forward through process 500. In so doing, secondary device 420 must ascertain its own media sense 508 as described above. Specifically, the goal of ascertaining media sense 508 is to define whether or not secondary device 420 is still in contact with the network.

With reference now to step 706 of FIG. 7 and to FIG. 5, the present invention re-establishes a master device 418. Specifically, once secondary device 420 recognizes its media sense 508, it will then take over the role as master device 418. In so doing, the possible network disruption, due to the loss of the previous master device 418, is avoided. Further, any type of network downtime and technical support are also negligible. In addition, the use of a multicast packet such as information packet 404 allows a sniffer tool to follow the flow of the network and determine which of the plurality of devices 312 is master device 418, and what process was accomplished by the network to maintain itself during a fail-over. This ability of the present invention to utilize sniffer tools to analyze traffic, and detect bottlenecks and problems in the network, also allows for extremely efficient network troubleshooting. Specifically, unlike the prior art wherein proprietary protocol conflict resolution cannot be followed precisely and network troubleshooting is extremely time consuming and difficult, the present invention allows both internal networking conflict resolution and the ability to follow the decisions made by the network via a sniffer tool.

Thus, the present invention provides, in various embodiments, a method and system for fault management in a distributed network management station. The present invention also provides a method and system for fault management in a distributed network management station which is scalable. The present invention further provides a method and system for fault management in a distributed network management station which automatically learns about the presence of other participating devices. The present invention also provides a method and system for fault management in a distributed network management station which is self-healing.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications are suited to the particular use contemplated. It is intended that the scope of the invention be defined by the Claims appended hereto and their equivalents.

What is claimed is:

1. A method for fault management in a distributed network management station comprising:
    initiating a first device coupled to a network; and
    determining a status of the first device as a master device of the network or a slave device of the network by:
        broadcasting, from the first device an information packet over the network, the information packet indicating whether the first device had a prior status as a master device in a previous operational period,
        listening, at the first device, for one or more responses to the information packet from one or more second devices coupled to the network, the one or more responses indicating a current state of the corresponding second devices as either master or slave devices of the network, and a prior status of the corresponding second devices as master devices in previous operational periods, wherein the information packet further comprises information regarding a total system-up-time of the first device and the responses indicate information regarding corresponding total system-up-times of the one or more second devices, the total system-up-times of the first device and the one or more second devices to indicate a total time the corresponding first device or one or more second devices have been in an operational mode,
        comparing the total system-up-times of the first device and the one or more second devices, and
        determining the first device is the master device of the network or slave device of the network according to the comparison of the total system-up-times.

2. The method as recited in claim 1, wherein said first device automatically initiates as a slave device.

3. The method as recited in claim 1, wherein said information packet comprises a participating-device internet protocol (IP) of said first device.

4. The method as recited in claim 3, wherein said information packet also comprises a participating-device message authentication code (MAC) of said first device.

5. The method as recited in claim 1, further comprises determining the first device is the master of the network when no responses were received to the information packet.

6. The method as recited in claim 1,
    wherein said information packet additionally comprises information regarding a current state of said first device as a slave device of the network; and
    determining the first device is the master device of the network based, at least in part, on any responses received from the one or more second devices coupled to the network.

7. The method as recited in claim 1, further comprises:
    comparing the prior status of the first device with the prior status of the one or more second devices received in the response to the information packet when one of the second devices is not currently the master device of the network according to the received responses; and
    determining the first device is the master device of the network or a slave device of the network according to the comparison of the prior status of the first device with the prior status of the one or more second devices.

8. The method as recited in claim 1, wherein said distributed network management station integrates plug-and-play capability of each of the plurality of devices into said network.

9. The method as recited in claim 1, wherein said distributed network management station integrates scalability of each of the plurality of devices into said network.

10. The method as recited in claim 1, wherein said distributed network management station integrates self-healing capabilities of each of the plurality of devices into said network.

11. A method for fault management in a distributed network management station comprising:
    determining a status of a first device as a master device of a network or a slave device of the network by:
        broadcasting, from the first device, an information packet over the network, the information packet indicating whether the first device has a prior status as a master device in a previous operational period,
        listening, at the first device, for one or more responses to the information packet from one or more second devices coupled to the network, the one or more responses indicating a current state of the corresponding second devices as either master or slave devices of the network, and a prior status of the corresponding second devices as master devicesin previous operational periods, wherein the information packet further comprises information regarding a total system-up-time of the first device and the responses indicate information regarding corresponding total system-up-times of the one or more second devices, the total system-up-times of the first device and the one or more second devices to indicate a total time the corresponding first device or one or more second devices have been in an operational mode,
        comparing the total system-up-times of the first device and the one or more second devices, and
        determining the first device is the master device of the network or a slave device of the network according to the comparison of the total system-up-times; and
    initiating a fail-over process, wherein said fail-over process results in at least one of said slave devices re-evaluating which device coupled to the networks is said master device.

12. The method as recited in claim 11, wherein said information packet broadcast by said first device further comprises:
   transmitting a participating-device internet protocol (IP) of said first device;
   transmitting a participating-device message authentication code (MAC) of said first device;
   transmitting information regarding the previous state of said first device;
   transmitting information regarding the current state of said first device; and
   transmitting information regarding the total system-up-time of said first device.

13. The method as recited in claim 11, wherein said distributed network management station integrates plug-and-play capability of each of the plurality of devices into said network.

14. The method as recited in claim 11, wherein said distributed network management station integrates scalability of each of the plurality of devices into said network.

15. The method as recited in claim 11, wherein said distributed network management station integrates self-healing capabilities of each of the plurality of devices into said network.

16. The method as recited in claim 11, wherein said re-evaluation by the slave device occurs due to a loss of communication with said master device.

17. The method as recited in claim 16, wherein said re-evaluation by the slave device comprises questioning said master device for state or status.

18. The method as recited in claim 17, wherein said state or status of said master device comprise at least one of said master device in a paused state, said master device in a crashed state, transmission control protocol (TCP) disconnect from said master device, or overall loss of master device.

19. A computer system comprising:
   a bus;
   a memory unit coupled to the bus; and
   a processor coupled to the bus, the processor to broadcast an information packet over a network, the information packet indicating whether the computer system had a prior status as a master device in a previous operational period, to listen for one or more responses to the information packet from at least another device coupled to the network, the one or more responses indicating a current stste of the corresponding other device as either master or slave device of the network, and a prior status of the corresponding other device as a master device in previous operational periods, wherein the information packet further comprises information regarding a total system-up-time of the computer system and the responses indicate information regarding corresponding total system-up-time of the other device, the total system-up-times of the computer system and the other device to indicate a total time the computer system or other device have been in an operational mode, the processor to compare the total system-up-times of the computer system and the other device and determine the computer system is the master device of the network or the slave device of the network according to the comparison of the total system-up-times.

20. The computer system of claim 19, wherein said information packet comprises at least one of a participating-device internet protocol (IP) of said computer system,
   a participating-device message authentication code (MAC) of said computer system, information regarding the total system-up-time of said first device.

21. The computer system of claim 19, wherein said distributed network management station comprises at least one of plug-and-play capability of said computer system, scalability of said computer system, or self-healing capability of said computer device.

22. The computer system of claim 19, wherein the processor is configured to re-evaluate the status of the computer system as the master device or slave device of the network when the computer system, as a slave device, loses communication with the master device.

23. The computer system of claim 19, wherein the processor configured to resolve the status of the computer system by:
   comparing the prior status of the computer system with the prior status of the other device received in the response to the information packet, and
   determining the first device is the master device of the network or the slave device of the network according to the comparison.

24. The computer system of claim 23, wherein said state or status of said master device comprise at least one of:
   a paused state;
   a crashed state;
   a transmission control protocol (TCP) disconnect; or
   overall loss of master device.

25. A computer-usable memory having computer-readable program code embodied therein for causing a computer system to perform fault management in a distributed network management station that comprises:
   broadcasting, from a first device, an information packet over a network, the information packet indicating whether the first device has a prior status as a master device in a previous operational period;
   listening, at the first device, for one or more responses to the information packet from one or more second devices coupled to the network, the one or more responses indicating a current state of the corresponding second devices as either master or slave devices of the network, and a prior status of the corresponding second devices as master devices in previous operational periods, wherein the information packet further comprises information regarding a total system-up-time of the first device and the responses indicate information regarding corresponding total system-up-times of the one or more second devices, the total system-up-times of the first device and the one or more second devices to indicate a total time the corresponding first device or one or more second devices have been in an operational mode;
   comparing the total system-up-times of the first device and the one or more second devices; and
   determining the first device is the master device of the network or the slave device of the network according to the comparison of the total system-up-times.

26. The computer-usable memory of claim 25, wherein said first device initiates as a slave device.

27. The computer-usable memory of claim 25, wherein said information packet comprises a participating-device internet protocol (IP) of said first device.

28. The computer-usable memory of claim 27, wherein said information packet also comprises a participating-device message authentication code (MAC) of said first device.

29. The computer-usable memory of claim 25, further comprises determining the first device is the master of the network when no responses were received to the information packet.

30. The computer-usable memory of claim 25, wherein said information packet additionally comprises information regarding a current state of said first device as a slave device of the network; and determining the first device is the master device of the network based, at least in part, on any responses received from the one or more second devices coupled to the network.

31. The computer-usable memory of claim 25, further comprises:

comparing the prior status of the first device with the prior status of the one or more second devices received in the response to the information packet when one of the second devices is not currently the master device of the network according to the received responses; and determining the first device is the master device of the network or the slave device of the network according to the comparison of the prior status of the first device with the prior status of the one or more second devices.

32. The computer-usable memory of claim 25, wherein said distributed network management station integrates plug-and-play capability of said first device into said network.

33. The computer-usable memory of claim 25, wherein said distributed network management station integrates scalability of said first device into said network.

34. The computer-usable memory of claim 25, wherein said distributed network management station integrates self-healing capabilities of said first device into said network.

35. A system comprising:

means for broadcasting, from a first device, an information packet over a network, the information packet indicating whether the first device has a prior status as a master device in a previous operational period;

means for listening, at the first device, for one or more responses to the information packet from one or more second devices coupled to the network, the one or more responses indicating a current state of the corresponding second devices as either master or slave devices of the network, and a prior status of the corresponding second devices as master devices in previous operational periods, wherein the information packet further comprises information regarding a total system-up-time of the first device and the responses indicate information regarding corresponding total system-up-times of the one or more second devices;

means for comparing the total system-up-times of the first device and the one or more second devices; and means for determining the first device is the master device of teh network or the slave device of the network according to the comparison of the total system-up-times.

36. The system of claim 35, wherein said first device initiates as a slave device.

37. The system of claim 35, wherein said information packet comprises a means for a participating-device internet protocol (IP) of said first device.

38. The system of claim 37, wherein said information packet also comprises a means for a participating-device message authentication code (MAC) of said first device.

39. The system of claim 35, further comprising means for determining the first device is the master of the network when no responses were received to the information packet.

40. The system of claim 35, wherein said information packet additionally comprises means for providing information regarding a current state of said first device; and means for determining the first device is the master device of the network based, at least in part, on any responses received from the one or more second devices coupled to the network.

41. The system of claim 35, further comprising:

means for comparing the prior status of the first device with the prior status of the one or more second devices received in the response to the information packet when one of the second devices is not currently the master device of the network according to the received responses; and means for determining the first device is the master device of the network or the slave device of the network according to the comparison of the prior status of the first device with the prior status of the one or more second devices.

42. The system of claim 35, wherein said distributed network management station comprises a means for integrating plug-and-play capability of said first device into said network.

43. The system of claim 35, wherein said distributed network management station comprises a means for integrating scalability of said first device into said network.

44. The system of claim 35, wherein said distributed network management station comprises a means for integrating self-healing capabilities of said first device into said network.

\* \* \* \* \*

UNITED STATES PATENT AND TRADEMARK OFFICE
CERTIFICATE OF CORRECTION

PATENT NO.         : 7,499,977 B1                                    Page 1 of 1
APPLICATION NO. : 10/047211
DATED              : March 3, 2009
INVENTOR(S)        : Sudhakar Valluru It is certified that error appears in the above-identified patent and that said Letters Patent is hereby corrected as shown below:

At column 9, line 36, please delete "device" and insert -- device, --.

At column 10, line 40, please delete "has" and insert -- had --.

At column 10, line 49, please delete "devicesin" and insert -- devices in --.

At column 10, line 66, please delete "networks" and insert -- network --.

At column 11, line 46, please delete "stste" and insert -- state --.

At column 11, line 66, please delete "information" and insert -- or information --.

At column 12, line 5, please delete "device." and insert -- system. --.

At column 12, line 33, please delete "has" and insert -- had --.

At column 13, line 33, please delete "has" and insert -- had --.

At column 14, line 4, please delete "teh" and insert -- the --.

At column 14, line 9, please delete "for a" and insert -- for --.

Signed and Sealed this

Fifteenth Day of December, 2009

David J. Kappos
*Director of the United States Patent and Trademark Office*